(12) United States Patent
Lu et al.

(10) Patent No.: US 6,671,780 B1
(45) Date of Patent: Dec. 30, 2003

(54) MODIFIED LEAST RECENTLY ALLOCATED CACHE REPLACEMENT METHOD AND APPARATUS THAT ALLOWS SKIPPING A LEAST RECENTLY ALLOCATED CACHE BLOCK

(75) Inventors: Shih-Lien L. Lu, Portland, OR (US); Konrad Lai, Vancouver, WA (US)

(73) Assignee: Intel Corporation, Santa Clara, CA (US)

( * ) Notice: Subject to any disclaimer, the term of this patent is extended or adjusted under 35 U.S.C. 154(b) by 295 days.

(21) Appl. No.: 09/586,548

(22) Filed: May 31, 2000

(51) Int. Cl.[7] ............................................... G06F 12/08
(52) U.S. Cl. ...................... 711/136; 711/134; 711/135; 711/138; 711/160
(58) Field of Search ................... 711/136, 160, 711/133, 134, 145, 135, 138, 163, 170, 159, 155; 712/32

(56) References Cited

U.S. PATENT DOCUMENTS

| | | | | |
|---|---|---|---|---|
| 5,526,511 A | * | 6/1996 | Swenson et al. | 711/134 |
| 5,715,427 A | * | 2/1998 | Barrera et al. | 711/136 |
| 5,737,753 A | * | 4/1998 | Tsuchiya et al. | 711/136 |
| 5,778,442 A | * | 7/1998 | Ezzat et al. | 711/136 |
| 5,897,655 A | * | 4/1999 | Mallick | 711/134 |
| 5,966,722 A | * | 10/1999 | Singh et al. | 711/100 |
| 6,161,167 A | * | 12/2000 | Witt | 711/136 |
| 6,230,237 B1 | * | 5/2001 | Tao et al. | 711/108 |
| 6,240,489 B1 | * | 5/2001 | Durham et al. | 711/129 |
| 6,345,344 B1 | * | 2/2002 | Arimilli et al. | 711/121 |
| 6,523,092 B1 | * | 2/2003 | Fanning | 711/134 |

* cited by examiner

Primary Examiner—Matthew Kim
Assistant Examiner—Pierre-Michel Bataille
(74) Attorney, Agent, or Firm—Marger Johnson & McCollom, P.C.

(57) ABSTRACT

A modified least recently allocated cache enables a computer to use a modified least recently allocated cache block replacement policy. In a first embodiment, an indicator of the least recently allocated cache block is tracked. When a cache block is referenced, the referenced cache block is compared with the least recently allocated cache block indicator. If the two identify the same cache block, the least recently allocated cache block indicator is adjusted to identify a different cache block. This adjustment prevents the most recently referenced cache block from being replaced. In an alternative embodiment, the most recently referenced cache block is similarly tracked, but the least recently allocated cache block is not immediately adjusted. Only when a new cache block is to be a located are the least recently allocated cache block indicator and the most recently referenced cache block indicator compared. Then, if the two indicators identify the same block, a different cache block is selected for the allocating the new cache block.

18 Claims, 9 Drawing Sheets

MODIFIED LEAST RECENTLY ALLOCATED CACHE REPLACEMENT METHOD AND APPARATUS THAT ALLOWS SKIPPING A LEAST RECENTLY ALLOCATED CACHE BLOCK

FIELD OF THE INVENTION

This invention pertains to caches in computer systems, and more particularly to a method for replacing blocks in the cache.

BACKGROUND OF THE INVENTION

Caches provide a closer, faster access to important information for the Central Processing Unit (CPU) of a computer. For example, caches are often used to store memory blocks that have been accessed recently by the CPU. But it is not practical to make caches large enough to store all of the available memory blocks. Aside from the obvious fact that such a large cache would make the main memory unnecessary, cache memory is more expensive than main memory. To keep costs down, caches tend to be small in size relative to main memory.

Because caches cannot store every block in main memory, when a new block needs to be allocated from the cache, the cache must use a replacement policy to decide what block currently in the cache is to be replaced. Various replacement policies are known in the art. The random replacement policy randomly selects an existing cache block to replace. The Least Recently Allocated (LRA, sometimes also called First In, First Out, or FIFO) replacement policy tracks how long each block has been in the cache and replaces the block that has been in the cache the longest. The Least Recently Used (LRU) replacement policy tracks how long it has been since each block in the cache has been used and replaces the block that has gone the longest since it was last used.

Assuming that the sequence of memory block misses is not known in advance, the LRU replacement policy generally provides the best performance. However, the LRU replacement policy is the most complicated replacement policy to implement. Information about each cache block access must be kept to maintain the order of cache block accesses, thus requiring fields to be updated at every access. The random and LRA replacement policies are easier to implement but provide poorer performance.

The present invention addresses this and other problems associated with the prior art.

DETAILED DESCRIPTION

Definitions

The simplest cache organization enables every block of main memory to be stored in any block in the cache. A cache organized along these lines is called fully associative. But other cache organizations are possible. Another common cache organization is called set associative. In a set associative cache, the blocks in the cache are partitioned into sets. Each set stores an identical number of blocks of the cache. Each block of main memory can be stored in only one set in the cache, but can be cached in any block within the set. All blocks within the set can be tested in parallel to see if they store a desired memory block. And because each block of main memory can be cached in only one set within the cache, only one set of blocks must be tested for a particular desired memory block. The advantage of a set associative cache is that when a request for a block of memory is received, the cache can check several blocks in parallel. Parallel testing for the block of memory reduces the time required to determine if a block of memory is already in the cache.

To use a set associative cache, the memory address of interest is divided into three parts. The first part of the address, composed of the highest order bits, is called the tag. The tag is used to distinguish between different blocks of memory that can be stored in a particular set in the cache. The second part of the address is called the set address. It is the set address that determines in which set the block of memory is cached. The third part of the address, the byte, composed of the lowest-order bits, specifies the desired byte within the cached block. Note that the length of the byte portion is dependent on the number of cache blocks in each set and the size of each cache block, and can have more or fewer than eight bits.

The number of blocks in each set defines the degree of associativity. Thus, for example, a 4-way associative cache has four blocks in each set. In the degenerate case where the sets in the block only have one block apiece, the cache is termed direct-mapped. (A fully associative cache can also be thought of as a degenerate case of the set associative cache, where there is only one set in the cache.) Thus, in a direct-mapped cache, there is only one block in the cache that can possibly hold a local copy of the memory block. The invention is not applicable to direct-mapped caches. The invention is only applicable to set associative and fully associative caches.

Figure 1:
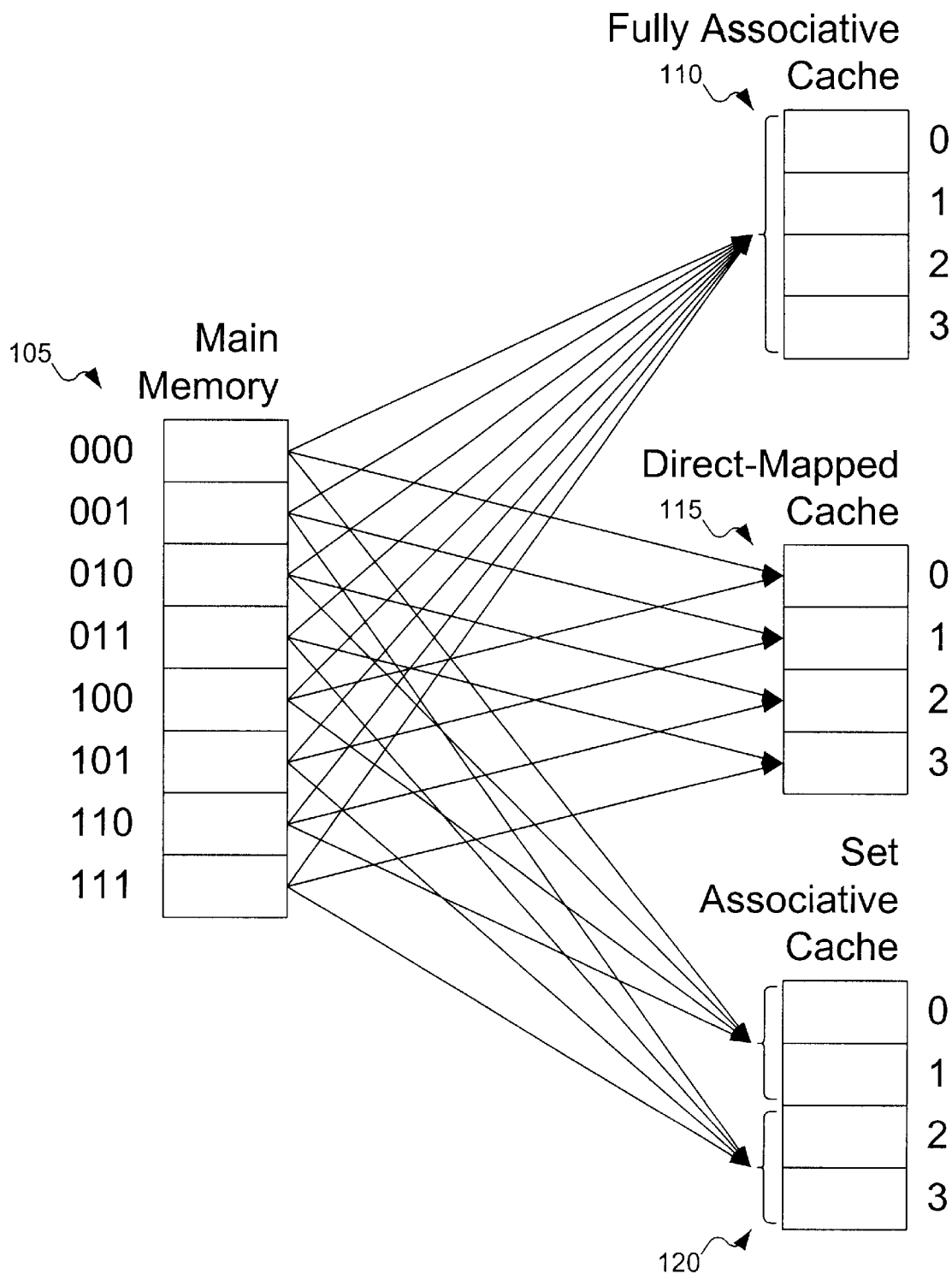
FIG. 1 shows the differences between fully associative caches, direct-mapped caches, and set associative caches.

FIG. 1 shows the differences between fully associative caches, direct-mapped caches, and set associative caches. In FIG. 1, main memory 105 includes eight blocks of memory, numbered from 0 to 7 in binary. (For simplicity, the byte portion of the memory address starting each memory block is left off of FIG. 1.) In fully associative cache 110, any of cache blocks 0–3 can cache any of memory blocks 0–7. In direct-mapped cache 115, cache block 0 can cache memory blocks 0 or 4, cache block 1 can cache memory blocks 1 or 5, etc. And in set associative cache 120 (which is a 2-way associative cache), cache blocks 0 and 1 can cache memory blocks 0, 2, 4, or 6, and cache blocks 2 and 3 can cache memory blocks 1, 3, 5, or 7. Thus, for purposes of using set associative cache 120, the two high-order bits of the memory block number are the tag, and the low-order bit of the memory block number is the set address.

The Invention

Figure 2:
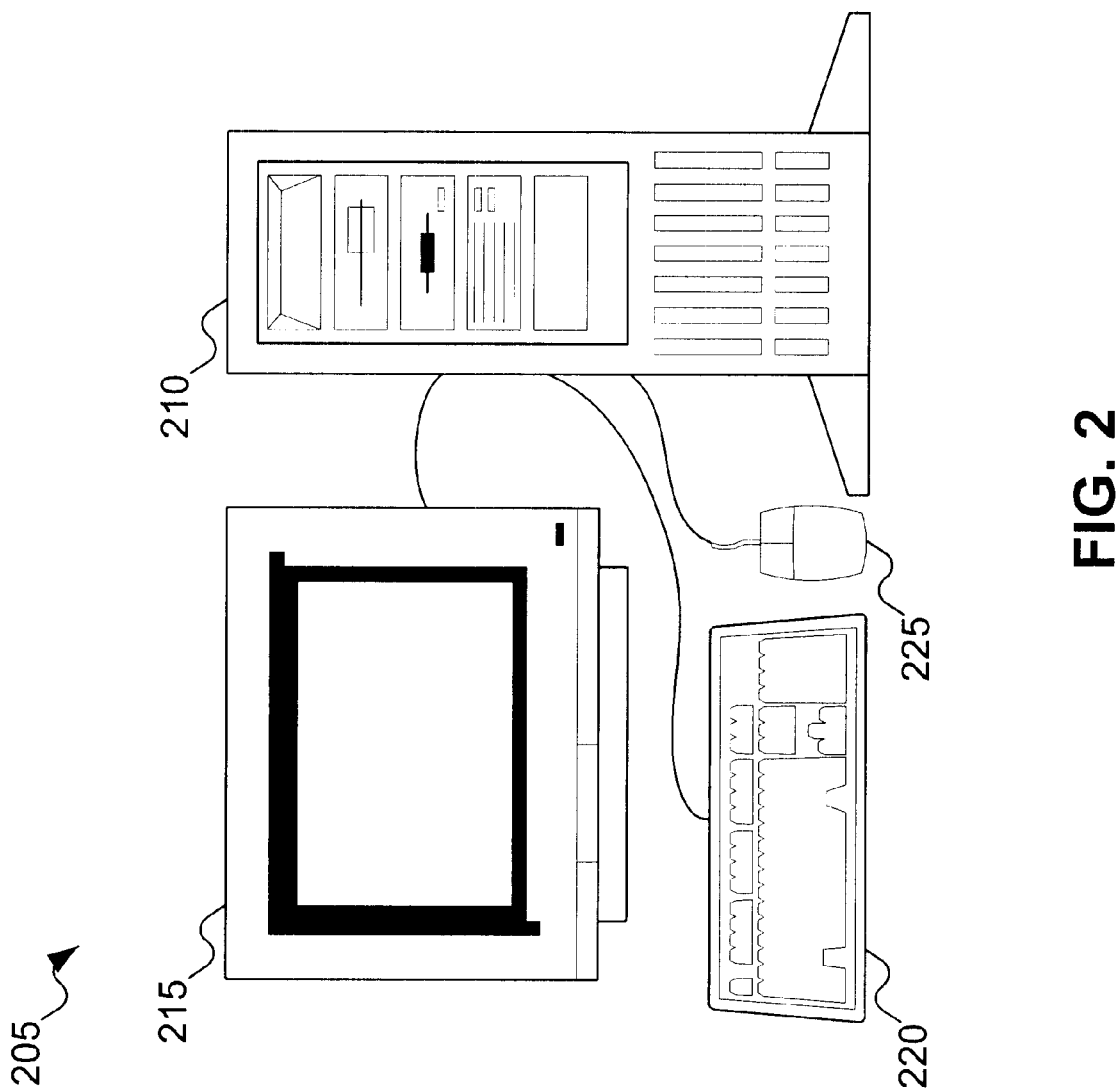
FIG. 2 shows a computer system in which a cache according to a first embodiment can be installed.

FIG. 2 shows a computer system 205 in accordance with a first embodiment of the invention. Computer system 205 includes a computer 210, a monitor 215, a keyboard 220, and a mouse 225. Computer 210 includes a central processing unit, a memory, and a cache according to the first embodiment of the invention (not shown). Computer system 205 can also include other equipment not shown in FIG. 2, for example, other input/output equipment or a printer. The first embodiment can be used with other apparatuses: for example, embedded computers and digital signal processors. A person skilled in the art will also recognize other uses for the first embodiment of the invention.

Figure 3:
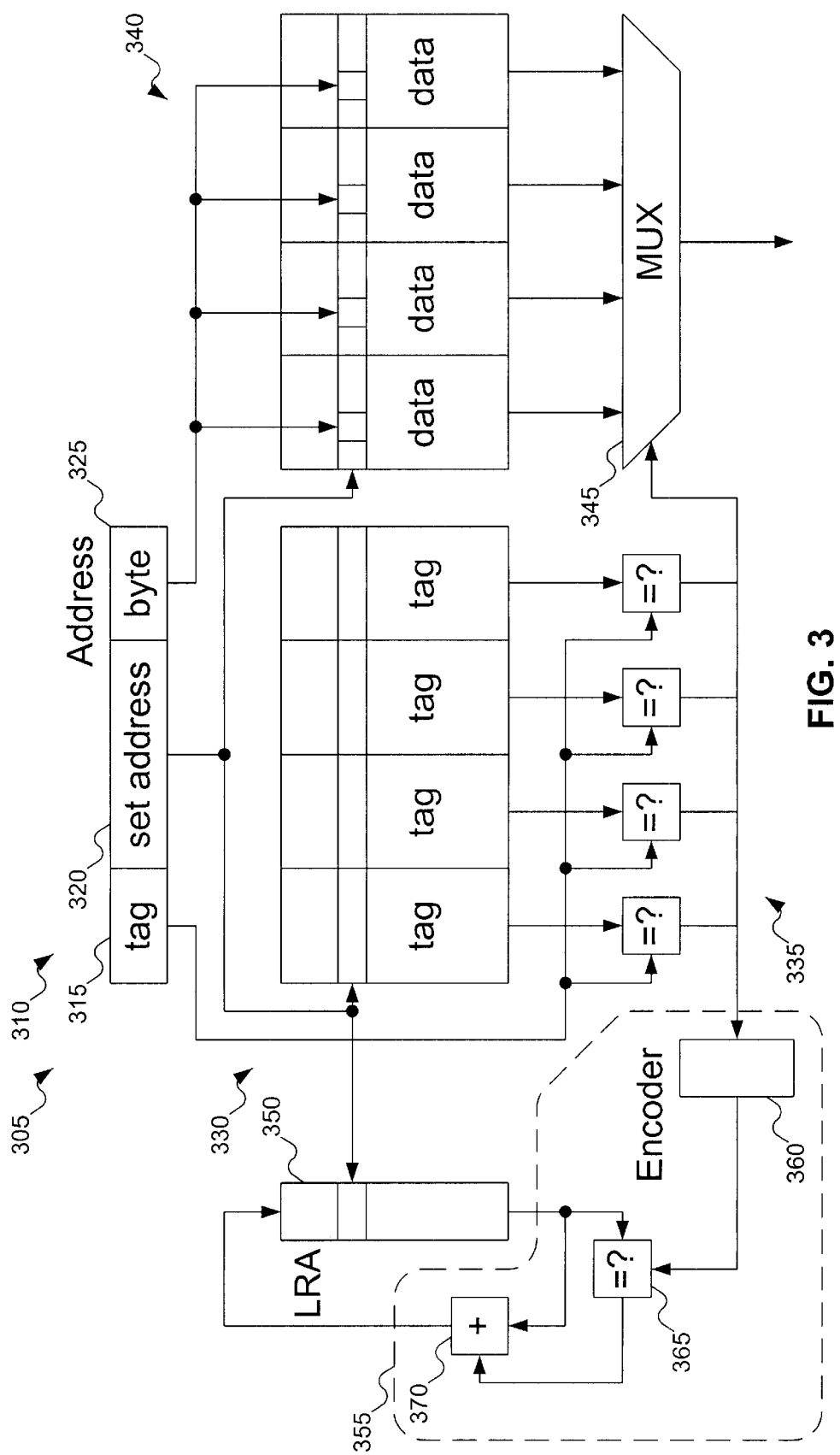
FIG. 3 shows a Least Recently Allocated (LRA) cache modified according to the first embodiment of the invention.

FIG. 3 shows an example Least Recently Allocated (LRA) cache modified according to the first embodiment of the invention. The cache of FIG. 3 is a 4-way associative cache (i.e., it is a set associative cache with four degrees of associativity). However, a person skilled in the art will recognize that the cache can have any degree of associativity, and can also be fully associative. In cache 305, memory address 310 is decomposed into tag 315, set address 320, and byte 325. Referring back to FIG. 1 temporarily will help explain the concepts of tag and set address. In FIG. 1, if the low-order bit of the memory block address (i.e., the set address) is "0" then the memory block is cached in the first set, otherwise the memory block is cached in the second set. A person skilled in the art will recognize how this extends to caches with more than two sets.

Returning to FIG. 3, set address 320 is input to tag block 330 to determine the tags of the blocks in each of the four sets in tag block 330 that can cache set address 320. These tags are then compared with tag 315 by comparators 335. If the memory block with tag 315 and set address 320 is currently cached in cache 305, one of comparators 335 will return an affirmative result.

At the same time that tag block 330 is being accessed to determine if memory address 310 is currently in cache 305, set address 320 and byte 325 are passed to each of the sets in data block 340. Recall that byte 325 can have more or fewer than eight bits, and its length is dependent the size of the cache blocks. The desired byte from each potentially-correct cached block in data block 340 is retrieved. These bytes are input to multiplexer 345. The outputs of comparators 335 control the line selection of multiplexer 345. If any of the tags in tag block 330 match the tag of memory address 310, the data drawn from the corresponding block in data block 340 will be output from multiplexer 345.

Cache 305 also includes least recently allocated indicator 350. Least recently allocated indicator 350 indicates the way (i.e., the block in the set) that was least recently allocated from memory. Least recently allocated indicator 350 can be thought of as a table, indexed by set address 320, that identifies the block in each set that was least recently allocated. In the first embodiment, least recently allocated indicator 350 includes a circular counter. The circular counter incrementally references each block in cache 305 in turn, and when the last block of cache 305 is reached, the circular counter resets, identifying the first block of cache 305. The specifics of least recently allocated counter 350 are known in the art and will not be repeated here. Similarly, FIG. 3 does not show the specifics of how blocks in cache 305 are swapped out and new memory blocks allocated in cache 305.

Skip mechanism 355 identifies the first embodiment of the invention. The term "skip mechanism" refers to the function of the first embodiment. The skip mechanism compares least recently allocated indicator 350 with a most recently referenced cache block to decide whether to skip the cache block identified by least recently allocated indicator 350 before allocating a new cache block. In skip mechanism 355 of FIG. 3, encoder 360 encodes the block referenced by memory address 310. Comparator 365 then compares the encoded block number with the block identified by least recently allocated indicator 350. If least recently allocated indicator 350 refers to the block caching memory address 310, then adder 370 increments least recently allocated indicator 350 to identify the next block in cache 305. In this manner, the most recently referenced cache block will not be the next cache block allocated for replacement.

Figure 4:
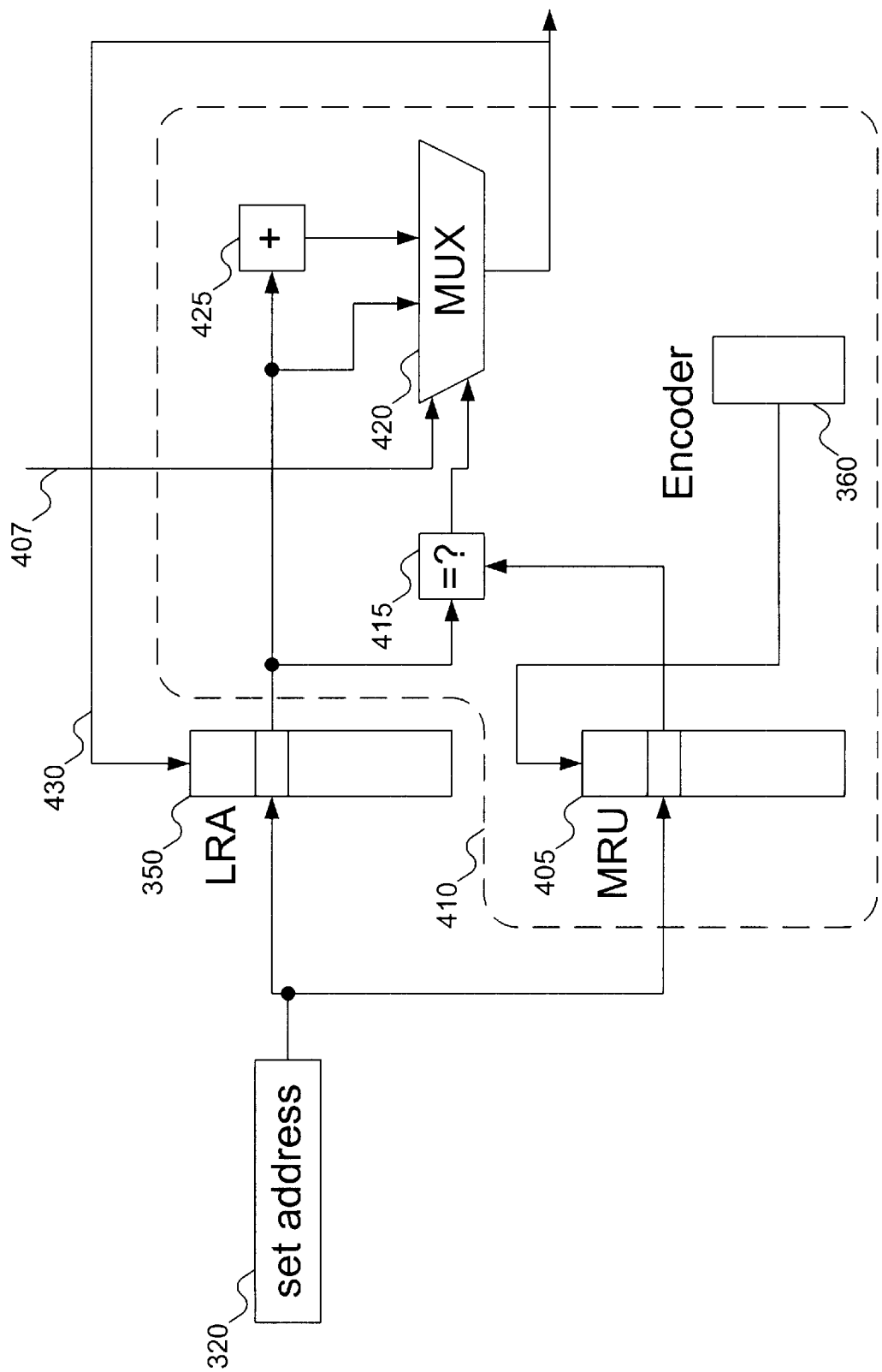
FIG. 4 shows a cache according to an alternate embodiment of the invention.

FIG. 4 shows an alternate embodiment for avoiding allocating the most recently used cache block. In FIG. 4, rather than updating least recently allocated indicator 350 when it identifies the most recently referenced block, the alternate embodiment uses most recently used indicator 405 to store the most recently used cache block. Most recently used indicator 405, like least recently allocated indicator 350, can be thought of as a table, indexed by set address 320, that identifies the block in each set that was least recently allocated. The principle behind this alternate embodiment is that there can be several cache references between allocations of memory blocks into the cache, and by the time a new cache block must be allocated, the most recently used cache block can change. Accordingly, updating least recently allocated indicator 350 may not be immediately necessary. In FIG. 4 cache miss signal 407 indicates that a cache block needs to be allocated. When a cache miss occurs, cache miss signal 407 is high. Otherwise, cache miss signal 407 is low.

In FIG. 4, the invention according to the alternate embodiment is shown as skip mechanism 410. As blocks in the cache are accessed, the accessed blocks, encoded by encoder 360, are stored in most recently used indicator 410. Most recently used indicator 405 is compared with least recently allocated indicator 350 in comparator 415. The output of comparator 415 is used to control multiplexer 420, which receives two inputs to select between: the cache block identified by least recently allocated indicator 350, and the output of adder 425, which takes the cache block identified by least recently allocated indicator 350 and determines the next cache block to allocate. Cache miss signal 407 is also used to control multiplexer 420, so that multiplexer 420 identifies a block for replacement in the cache only when a cache miss occurs. Assuming a cache miss has occurred (and cache miss signal 407 is high), feedback signal 430 uses the output of multiplexer 425 to update least recently allocated indicator 350.

Figure 7:
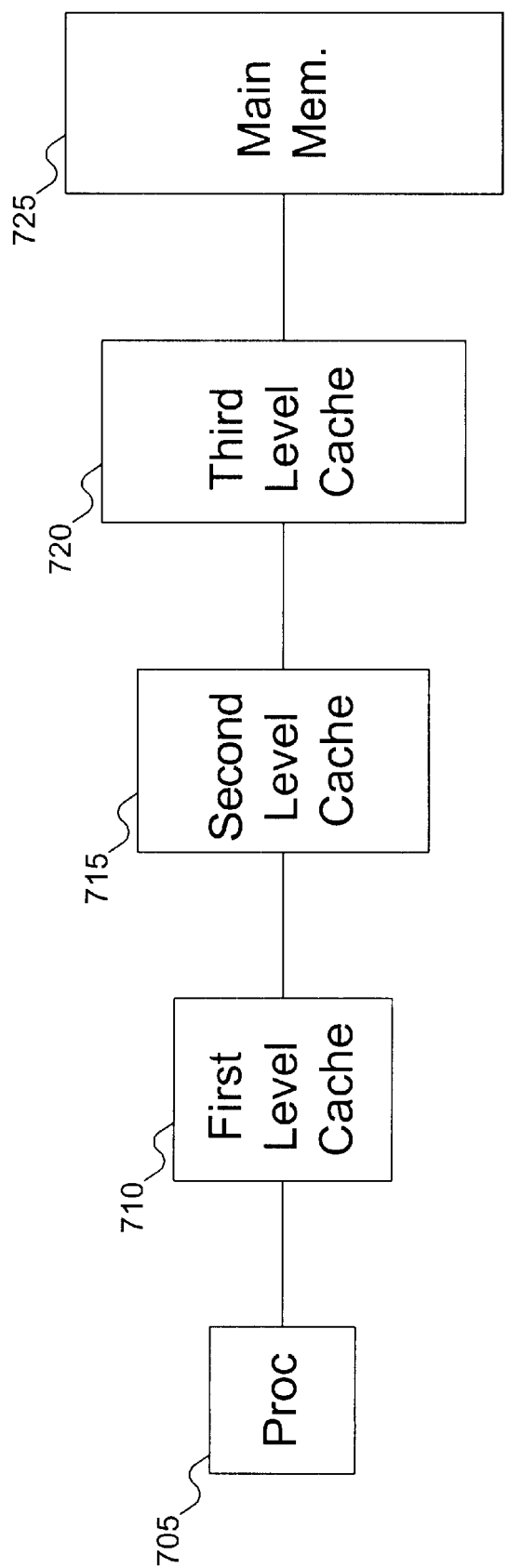
FIG. 7 shows a cache hierarchy for a computer system including three levels of cache.

Although the embodiments described above discuss only a single cache, a person skilled in the art will recognize that multi-level cache hierarchies are possible. FIG. 7 shows such a hierarchy for a computer system including three levels of cache. In a multi-level cache system, the memory blocks that have been most recently accessed by processor 705 are cached in first level cache 710. Cache blocks swapped out of first level cache 710 (when new memory blocks are allocated) are stored in second level cache 715, and cache blocks swapped out of second level cache 715 are stored in third level cache 720. (Cache blocks swapped out of the third level cache 720 are written back to main memory 725 if necessary and then discarded from the cache.) Typically, first level cache 710 is the fastest cache, but is also the most expensive, and therefore is the smallest cache.

Second level cache 715 is typically slower than first level cache 710 but is also less expensive, and is larger. Third level cache 720 is slower still than second level cache 715, but is even less expensive and larger still. The reason for the multi-level cache hierarchy is that accessing any of caches 710, 715, and 720 is generally faster than accessing main memory. Storing cache blocks hat have not been recently referenced in a secondary cache such as second level cache 715 or third level cache 720 reduces the expense of first level cache 710 but enables faster access to the block than returning to main memory 725.

Figure 8:
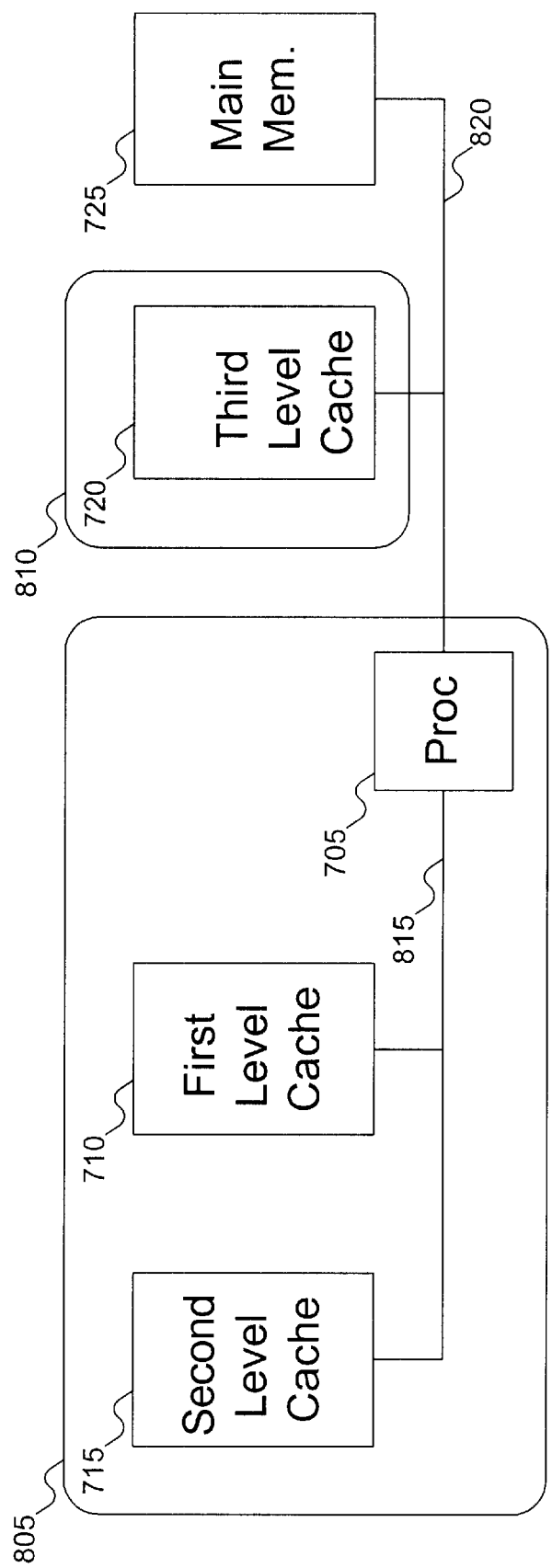
FIG. 8 shows one way in which the processor and cache hierarchy of FIG. 7 can be packaged.

FIG. 8 shows one way in which the processor and cache hierarchy of FIG. 7 can be packaged. In FIG. 8, processor 705, first level cache 710, and second level cache 715 are on die 805. Third level cache 720 is packaged on die 810 in a separate chip. Die 805 includes the necessary circuitry 815 for processor 705 to access first level cache 710 and second level cache 715. Processor 705 accesses third level cache 715 on die 810 via front-side bus 820, which also connects to memory 725.

Figure 9:
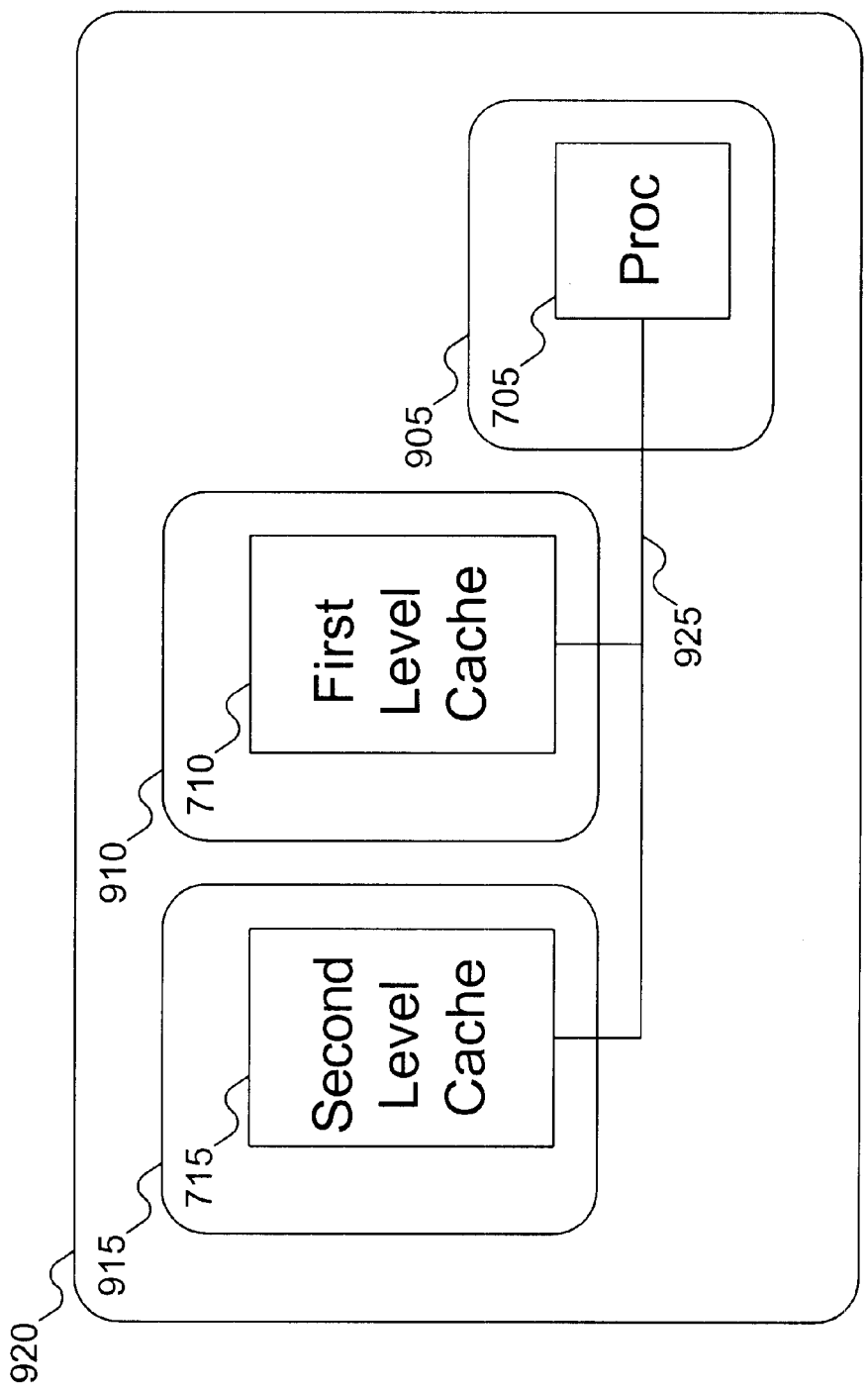
FIG. 9 shows a multi-chip module including the processor and first and second level caches of FIG. 7.

In another embodiment, processor 705 the caches can be on separate dies, but packaged in a single multi-chip module. FIG. 9 shows an example of processor 705, first level cache 710, and second level cache 715 of FIG. 7 packaged as a multi-chip module. Processor 705 is on die 905, first level cache 710 is on die 910, and second level cache 715 is on die 915. All three dies 905, 910, and 915 are on separate chips packaged within a single multi-chip module 920. But because the three chips are separate, the three components need to be able to communicate with each other. Back-side bus 925 allows the three components to communicate.

Although FIGS. 8 and 9 describe two particular ways of packaging a cache according to the above-described embodiments with a processor and memory, a person skilled in the art will recognize that many variations are possible. For example, fewer or more than three levels of cache can be used, only the first level cache can be packaged on the same die as the processor, and so forth.

Figure 5:
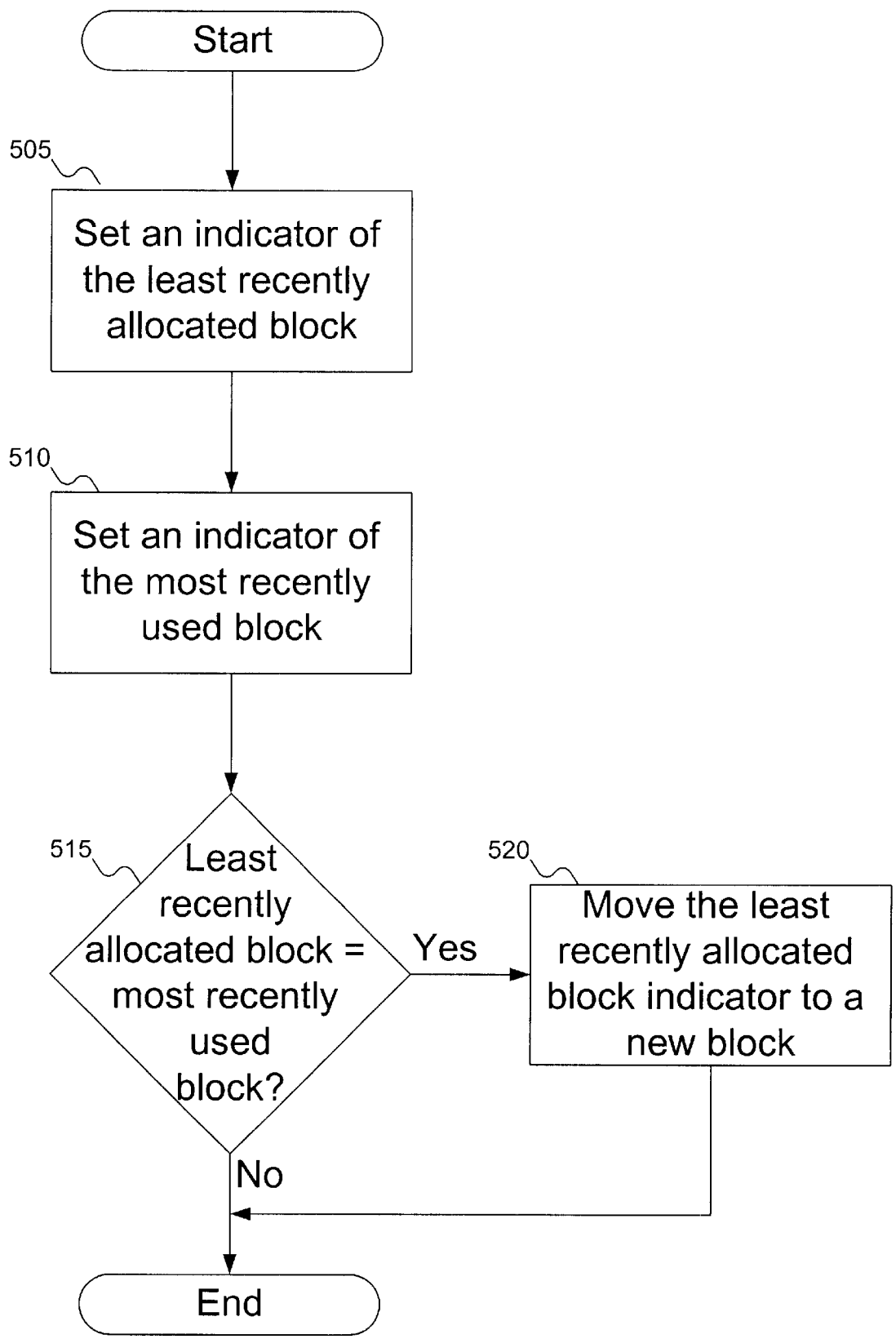
FIG. 5 is a flowchart showing how the cache of FIG. 3 updates the least recently allocated block indicator according to the first embodiment.

FIG. 5 is a flowchart showing how the cache of FIG. 3 updates the least recently allocated block indicator according to the first embodiment. At some point, as indicated in block 505, the least recently allocated block indicator is set. When the cache is empty (i.e., no blocks have yet been allocated), the indicator can point to any block in the cache; and after a block has been allocated, the indicator is set to point to some other block in the cache as the next block to allocate. In the first embodiment, the indicator points to each block in the cache in a circular order, but a person skilled in the art will recognize that more complicated arrangements can be made. After a cache block is referenced (i.e., a memory address is referenced that happens to be in the cache), at block 510 the referenced cache block is noted. At decision point 515 the least recently allocated block is compared with the most recently referenced block. If the two are the same cache block, then at block 520 the least recently allocated block indicator is set to identify another cache block.

Figure 6:
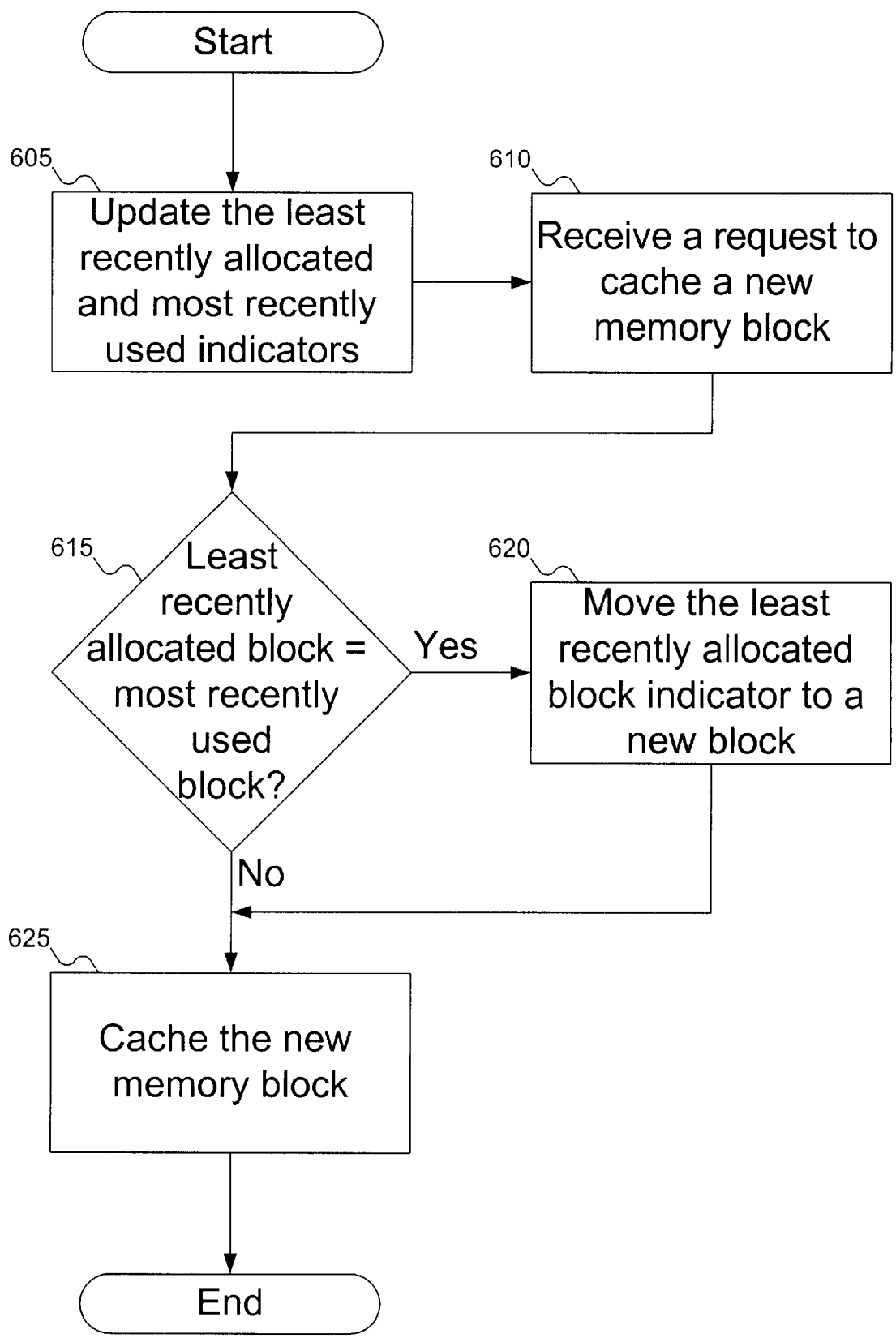
FIG. 6 is a flowchart showing how a cache using the skip mechanism of FIG. 4 replaces a block according to the alternate embodiment.

FIG. 6 is a flowchart showing how a cache using the skip mechanism of FIG. 4 replaces a block according to the alternate embodiments. At block 605, the least recently allocated block and the most recently referenced indicators are set. The indicators are set as discussed above with reference to FIG. 5. At block 610 a request to cache a new memory block is received. At decision point 615 the least recently allocated block is compared with the most recently referenced block. If the two are the same cache block, then at block 620 the least recently allocated block indicator is set to identify another cache block. Finally, at block 625 the new memory block is cached in the cache block identified by the least recently allocated block indicator.

As discussed above, the Least Recently Allocated (LRA) replacement policy is easier to implement than the Least Recently Used (LRU) replacement policy, but at the cost of reduced performance. An advantage of the invention is performance closer to the LRU replacement policy, but with implementation complexity closer to the LRA replacement policy. Moreover, least recently allocated indicator 350 does not need to be updated (read a cache line from least recently allocated indicator 350, modify the cache line, and write the modified cache line back to least recently allocated indicator 350) every time, as occurs using the LRU replacement policy. With the LRU replacement policy, the cache must keep track of the order in which the blocks in the cache have been accessed, and must update the order every time a cache block is accessed. Using the invention, the least recently allocated indicator 350 is updated only if the most recently referenced cache block and the least recently allocated cache block are the same cache block. In the first embodiment, the update happens whether or not a cache miss occurs; in the alternate embodiment, the update happens only if a cache miss occurs.

Having illustrated and described the principles of our invention, it should be readily apparent to those skilled in the art that the invention can be modified in arrangement and detail without departing from such principles. We claim all modifications coming within the spirit and scope of the accompanying claims.

We claim:

1. A cache comprising:
    a least recently allocated cache including a plurality of cache blocks;
    an allocation mechanism for copying memory blocks into the plurality of cache blocks;
    a least recently allocated block indicator identifying a least recently allocated cache block in the cache; and
    a skip mechanism for skipping a most recently referenced cache block on a cache hit.

2. A cache according to claim 1, wherein the skip mechanism is constructed and arranged to update the least recently allocated block indicator when the least recently allocated cache block and the most recently referenced cache block refer to the same cache block.

3. A cache according to claim 1, wherein the cache is a set associative cache.

4. A cache according to claim 1, wherein the cache is a fully associative cache.

5. A cache according to claim 1, wherein:
    the least recently allocated block indicator includes a counter identifying the least recently allocated cache block; and
    the skip mechanism includes:
        a comparator for comparing the least recently allocated cache block and the most recently referenced cache block; and
        an adder to increment the counter of the least recently allocated block indicator based on the comparator.

6. A cache according to claim 1, wherein the skip mechanism includes a pointer to the most recently referenced cache block.

7. A cache according to claim 1, wherein the skip mechanism includes:
    a comparator for comparing the most recently referenced cache block with the least recently allocated cache block;

an adder to select a second least recently allocated cache block; and a multiplexer for selecting between the least recently allocated cache block and the second least recently allocated cache block based on the comparator.

8. A modified least recently allocated cache for caching memory blocks from a main memory in a computer, the modified least recently allocated cache comprising:

means for setting a least recently allocated block indicator to identify a least recently allocated cache block;

means for setting a skip mechanism to identify a most recently referenced cache block on a cache hit; and if on the cache hit the least recently allocated cache block and the most recently referenced cache block are the same block, means for adjusting the least recently allocated block indicator to identify a second least recently allocated cache block.

9. A modified least recently allocated cache according to claim 8, wherein the means for adjusting the least recently allocated block indicator includes means adjusting the least recently allocated block indicator to identify the second least recently allocated cache block after a request to access the most recently referenced cache block.

10. A computer system comprising:

a processor;

a front-side bus connected to the processor;

a memory connected to the front-side bus, the memory including a plurality of blocks; and a modified least recently allocated cache for caching blocks from the memory, the modified least recently allocated cache including:

a plurality of cache blocks;

an allocation mechanism for copying a block from the plurality of memory blocks into the plurality of cache blocks;

a least recently allocated block indicator identifying a least recently allocated cache block in the cache; and a skip mechanism for skipping a most recently referenced cache block on a cache hit.

11. A computer system according to claim 10, wherein the modified least recently allocated cache and the processor are on the same die and are connected by circuitry.

12. A computer system according to claim 10, wherein the modified least recently allocated cache and the processor are on different dies.

13. A computer system according to claim 12, wherein the modified least recently allocated cache and the processor are connected by a back-side bus.

14. A computer system according to claim 10, wherein the modified least recently allocated cache is connected to the front-side bus.

15. A method for using a modified least recently allocated cache used to cache memory blocks in a computer, the method comprising:

setting a least recently allocated block indicator to identify a least recently allocated cache block;

setting a skip mechanism to identify a most recently referenced cache block on a cache hit; and if on the cache hit the least recently allocated cache block and the most recently referenced cache block are the same block, adjusting the least recently allocated block indicator to identify a second least recently allocated cache block.

16. A method according to claim 15, the method including receiving a request to cache a new memory block.

17. A method according to claim 15, wherein setting a skip mechanism includes receiving a request to access the most recently referenced cache block.

18. A method according to claim 15, wherein adjusting the least recently allocated block indicator includes adjusting the least recently allocated block indicator to identify the second least recently allocated cache block after a request to access the most recently referenced cache block.

* * * * *